(No Model.)
M. W. DEWEY.
METHOD OF MAGNETICALLY REDUCING FRICTION.
No. 408,465. Patented Aug. 6, 1889.
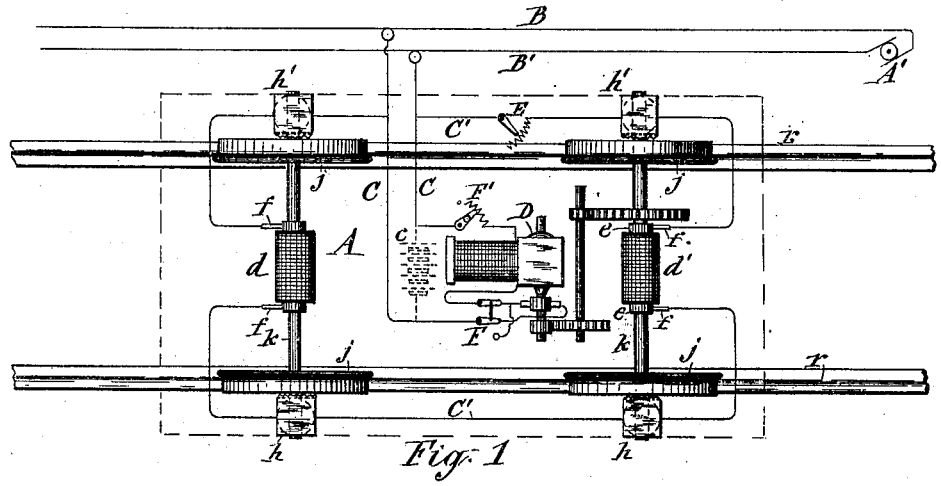
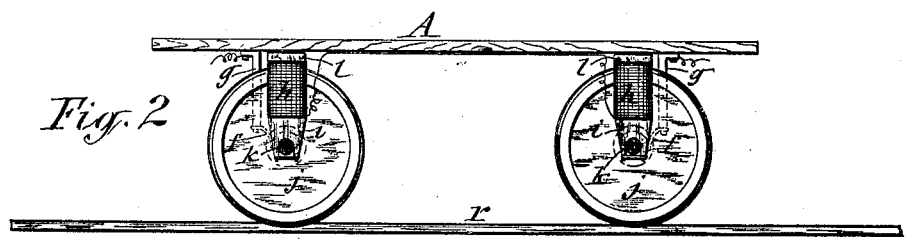
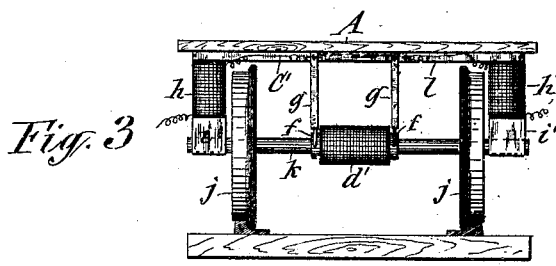
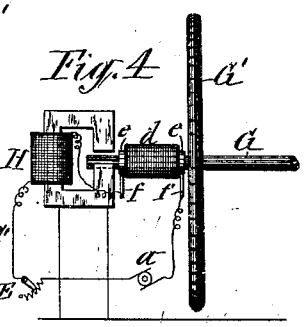
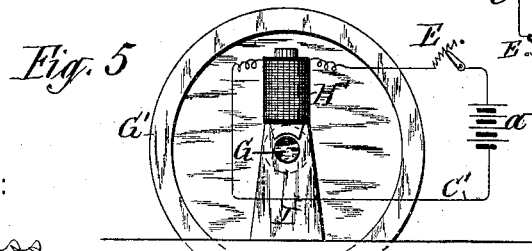
WITNESSES:
J. J. Laass
C. L. Bendixon
INVENTOR
Mark W. Dewey
BY
Duell, Laass & Duell
his ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

METHOD OF MAGNETICALLY REDUCING FRICTION.

SPECIFICATION forming part of Letters Patent No. 408,465, dated August 6, 1889.

Application filed June 6, 1889. Serial No. 313,363. (No model.)

*To all whom it may concern:*

Be it known that I, MARK W. DEWEY, of Syracuse, in the county of Onondaga, in the State of New York, have invented new and useful Improvements in Methods of Magnetically Reducing Friction, of which the following, taken in connection with the accompanying drawings, is a full, clear, and exact description.

My invention relates to a method of preventing or decreasing friction between parts of machinery in contact with each other or frictional bearings; and it consists in subjecting the said bearing parts to a magnetic force tending to separate them or reduce the pressure between the bearings, and thus prevent undue wear, heat, and waste of energy, and also reduce greatly, if not entirely, the consumption of oil or other lubricants.

In order to describe and illustrate my invention clearly, I have described and shown the same specially in connection with an electric-railway car; but it will be apparent that the principles of the invention may be embodied in apparatus widely differing from the specific construction shown, and that the methods of operation may be also varied without departing from the spirit of my invention, and I am therefore not limited to the identical features of detail herein set forth.

The magnetic force applied to said parts may be either attractive or repulsive, and in some cases both, as will be hereinafter described.

Referring to the drawings, Figure 1 represents a portion of an electric car-truck provided with my invention to prevent or decrease the friction between the rotating axle and the part bearing upon it, and the figure also shows a diagram of electric conductors connected with the apparatus for propelling the car, and also to accomplish the purpose of this invention. Fig. 2 is a side elevation of the most important part of Fig. 1. Fig. 3 is an end elevation of the same. Fig. 4 represents a fly-wheel of a piece of machinery and a portion of the shaft thereof having an anti-friction bearing that is subjected to both forces—attraction and repulsion. Fig. 5 represents a view of a bearing of a fly-wheel shaft that is affected by attraction only, the magnetism of the shaft being induced therein by the pole of the electro-magnet above the bearing.

Referring specifically to the drawings, A represents an electrically-propelled vehicle or car.

B and B' represent line-working conductors extending along the path of the car, and may be overhead, within a conduit or on the surface of the ground. The current may be supplied through said conductors from a dynamo A' or from a primary or secondary battery on the car, as indicated by dotted lines in the drawings and lettered c.

Some of the details belonging to an electric car have been omitted in the drawings for the sake of clearness.

C is the conductor on the car, passing through the motor D for propelling the car, and having its terminals in movable connection with the line-conductors, as usual.

C' is a shunt-circuit established around the motor and forming what may be herein termed the "anti-friction circuit." This shunt-circuit includes coils of wire preferably permanently wound concentrically around suitable cores, as the axles and bearing parts resting thereon, and an adjustable resistance. The coils or helices $d$ and $d'$ on the axles may be mounted loosely or may revolve therewith, as shown in the figures, and may be connected in circuit in series or in any other effective and convenient manner whereby the magnetic force will decrease the friction of the main frictional bearings of the vehicle without decreasing its traction. The terminals of a coil on the axle are connected to contact-rings $e$ at each end of the coil, insulated from the axle, which forms the core of the coil. Stationary contact-brushes $f$, connected to the conductor C', bear upon the periphery of said rings, and thus include the coil in circuit.

$g$ $g$ are electric conducting supports for the brushes $f$ and extend upward from the same to the body of the car. From the upper ends of the supports the circuit-wires extend to the coils $h$ and $h'$ on the bearings $i$ and $i'$. The latter coils are wound upon said bearings, which are of iron or steel, and form magnetic cores for the coils that together constitute electro-magnets, or, rather, a single electro-magnet with two coils. This magnet is similar to a common U-magnet, as the upper ends of the cores are connected by a bar or yoke $l$, extending above the wheels $j$ of the car and beneath the body thereof parallel with the axle $k$. The magnets of both axles are connected in circuit in the same manner, except that the coils are preferably wound, so that the poles are different on one and the same side of the car for the purpose of obtaining a greater increase of traction; but this is not absolutely necessary, and the traction of the car will be greatly increased whether the poles are different or not, as the polarity of a wheel being the same at all points on its periphery will induce in the rail $r$ at the point of contact an opposite polarity, producing adhesion between the parts. The opposite ends of an axle are of course of opposite polarity, and the bearings on the axles are of like polarity—that is, each end of the axle has a bearing of the same polarity as the axle. At one extremity of the axle two north poles are in contact and at the other extremity two south poles. Like poles repel each other, and this repulsion separates the parts more or less, according to the strength of the magnetism, &c. The adjustable resistance E is to control or vary the current through the circuit, which may be and is preferably opened when the car is at rest, thereby arresting the current in the circuit and the magnetic force at the bearings, thus preventing waste of energy.

F is the current-reverser to reverse the current through the armature, and thereby change the direction of its rotation, and F' is the adjustable resistance for controlling the amount of current through the motor to vary its speed.

In Fig. 4, G is the shaft of a fly-wheel G', having a coil $d$ mounted thereon, with contact-rings $e$ and brushes $f$ connected with the anti-friction circuit C', similar to the axle of the car in Fig. 1, but which in this case is directly supplied with current from a suitable source, as $a$. The bearing for the end of the shaft is a pole of an electro-magnet H in said circuit of the same polarity as the end of the shaft, and the parts tend to separate, as before explained; but in order to obtain an increased effect the opposite pole of said magnet is bent around so as to approach the said shaft or be in close proximity thereto at a point diametrically opposite the part in contact with the other pole. This latter pole helps by attraction to increase a separation of the parts in contact, and thus reduce friction between them, as it is of an opposite polarity from the shaft.

In Fig. 5, G is a shaft, and G' a fly-wheel thereon, the shaft having somewhat different means at the bearing to effect the desired result. The bearing part for the axle is a base of non-magnetic material I, the axle itself being magnetic. The said base supports an electro-magnet H over or diametrically opposite the axle-bearing, so that one of its poles is quite close to the axle. The coil of this magnet is in a circuit C', with a battery $a'$ and adjustable resistance E. The core of said magnet in proximity to the axle induces an opposite polarity in the same and slightly attracts it from the diamagnetic bearing, thus reducing the friction between the bearing parts.

It will be obvious that the source of current for the anti-friction circuit on a vehicle may be independent of the source supplying the motor, and may be generated by the movement of the vehicle operating a small dynamo in a suitable manner well known.

Having described my invention, what I claim as new, and desire to secure by Letters Patent, is—

1. The method of decreasing friction between the bearings of two magnetic parts, consisting in subjecting the bearing parts to magnetism of like polarity to separate the parts or reduce the pressure between the bearings.

2. The method of decreasing friction between the bearings of two paramagnetic parts, consisting in subjecting the bearing parts to magnetism of like polarity and subjecting to magnetism of unlike polarity another paramagnetic part in proximity to one of the said parts and diametrically opposite the other of said parts to separate the parts or reduce the pressure between their bearings.

3. The method of decreasing friction between the bearings of a magnetic part upon a non-magnetic part, consisting in subjecting to magnetism of a certain polarity another part in proximity to the magnetic part and diametrically opposite the non-magnetic part to separate the latter two parts and reduce the pressure between their bearings.

4. The method of decreasing friction between the bearing parts of a vehicle, consisting in establishing an electric circuit on the vehicle, including the coils of electro-magnets, and subjecting the bearing parts to magnetic force tending to separate the bearings or reduce the pressure between them.

5. The method of decreasing friction between the bearing parts of a vehicle, consisting in establishing an electric circuit on the vehicle, including the coils of electro-magnets wound to produce in the bearing parts magnetism of like polarity to separate the bearings or reduce the pressure between them.

6. The method of decreasing friction between the bearing parts of an electrically-propelled vehicle, consisting in establishing a shunt-circuit around the electric motor on the vehicle, including the coils of electro-magnets, and subjecting the aforesaid bearing parts to magnetic force tending to separate the bearings or reduce the pressure between them.

7. The method of decreasing friction between the bearing parts of an electrically-propelled vehicle having line-working conductors along its path and a conductor passing through the motor, with its terminals in movable contact with the line-conductors, consisting in establishing a shunt-circuit around the motor on the vehicle, including the coils of electro-magnets, and subjecting the aforesaid bearing parts to magnetic force tending to separate the bearings or reduce the pressure between them.

8. The method of decreasing friction between the bearing parts of a vehicle, consisting in establishing an electric circuit on the vehicle, including the coils of electro-magnets, subjecting the bearing parts to magnetic force tending to separate the bearings or reduce the pressure between them during the movement of the vehicle, and arresting said force when the vehicle is at rest.

9. The method of decreasing friction between the bearing parts of a vehicle, consisting in establishing an electric circuit on the vehicle, including the coils of electro-magnets, and subjecting the bearing parts to variable magnetic force tending to separate the bearings or reduce the pressure between them.

10. The method of decreasing friction between the bearing parts of a vehicle, consisting in establishing an electric circuit on the vehicle, including the coils of electro-magnets, subjecting the bearing parts to variable magnetic force tending to separate the bearings or reduce the pressure between them during the movement of the vehicle, and arresting said force when the vehicle is at rest.

11. The method of decreasing friction between the bearing parts of an electrically-propelled vehicle having line-working conductors along its path and a conductor passing through the motor, with its terminals in movable contact with the line-conductors, consisting in establishing a shunt-circuit around the motor on the vehicle, including the coils of electro-magnets, subjecting the aforesaid bearing parts to magnetic force tending to separate the bearings or reduce the pressure between them during the movement of the vehicle, and arresting said force when the vehicle is at rest.

12. The method of decreasing friction between the bearing parts of an electrically-propelled vehicle having line-working conductors along its path and a conductor passing through the motor with its terminals in movable contact with the line-conductors, consisting in establishing a shunt-circuit around the motor on the vehicle, including the coils of electro-magnets, subjecting the aforesaid bearing parts to variable magnetic force tending to separate the bearings or reduce the pressure between them during the movement of the vehicle, and arresting said force when the vehicle is at rest.

In testimony whereof I have hereunto signed my name this 4th day of June, 1889.

MARK W. DEWEY. [L. S.]

Witnesses:
C. H. DUELL,
C. L. BENDIXON.